(No Model.)

J. H. DOUGHTY.
FIRE POT FOR STOVES.

No. 247,623. Patented Sept. 27, 1881.

WITNESSES
Fred. G. Dieterich
John Madigan

INVENTOR,
James H. Doughty

By his Attorneys,
Louis Bagger & Co.

UNITED STATES PATENT OFFICE.

JAMES H. DOUGHTY, OF GLENWOOD, IOWA.

FIRE-POT FOR STOVES.

SPECIFICATION forming part of Letters Patent No. 247,623, dated September 27, 1881.

Application filed April 11, 1881. (No model.)

*To all whom it may concern:*

Be it known that I, JAMES H. DOUGHTY, of Glenwood, in the county of Mills and State of Iowa, have invented certain new and useful Improvements in Fire-Pots for Stoves; and I do hereby declare that the following is a full, clear, and exact description of the invention, which will enable others skilled in the art to which it appertains to make and use the same, reference being had to the accompanying drawings, which form a part of this specification, and in which—

Figure 1:
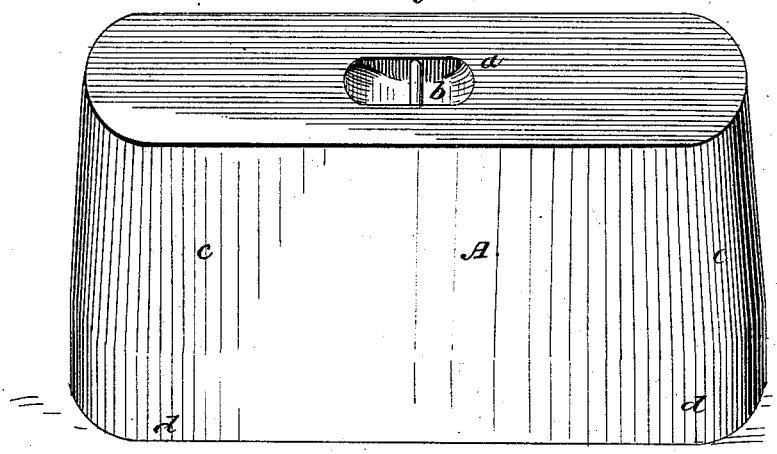
Figure 2:
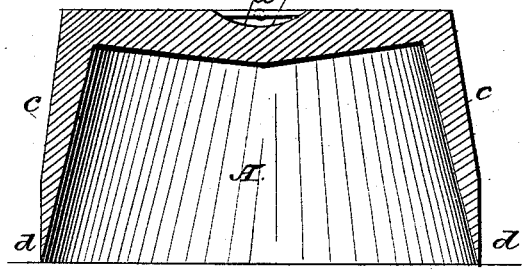
Figure 3:
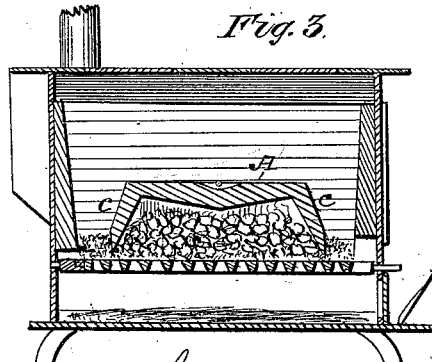

Figure 1 is a perspective view. Fig. 2 is a longitudinal section; and Fig. 3 shows the use or application of the pot to a stove or kitchen-range or parlor-stove.

Similar letters of reference indicate corresponding parts in all the figures.

My invention consists in the construction of a cast-iron pot or vessel which is adapted to fit in the stove or range, into which it may be inserted by removing the two front lids and the center piece between them, in such a manner as to cover and seal the fire raked together under the pot, the edges of which are depressed into the ashes, so as to form an air-tight compartment under the pot, as hereinafter set forth.

In the annexed drawings, A is the pot, which is made in one piece, of cast-iron, and has a recess or depression, $a$, in the flat top, which is spanned by a cross-bar, $b$. The pot is oval in shape, and of a size varying with the size or number of the stove or range for which it is to be used. It is cast with tapering sides $c$, which flare slightly outward and have a sharp lower rim or edge, $d$. The flat top is made of considerable thickness, for the double purpose of giving weight and solidity to the pot, so that it will sink with its sharp lower rim into the ashes by its own gravity.

The use of the pot will readily be understood by reference to Fig. 3 of the drawings without requiring further explanation. The glowing embers are raked together in a heap in the bottom of the stove and the pot is placed over them, as shown, with its rim depressed or sunk into the soft ashes, thus forming an air-sealed compartment under the pot. In this manner the fire may be kept from one meal to another, or during the night, without replenishing, thus saving a great deal of fuel.

The pot is lifted, by a hook or ordinary stove-lid lifter, by means of the cross-bar $b$ in the top recess, $a$.

Having thus described my invention, I claim and desire to secure by Letters Patent of the United States—

The cast-iron fire-pot A, of oval shape, having a thick top recessed at $a$, and provided with the cross-bar $b$ and flaring sides or walls $c$, tapering to a sharp rim or edge, $d$, as set forth.

In testimony that I claim the foregoing as my own I have hereto affixed my signature in presence of two witnesses.

JAMES H. DOUGHTY.

Witnesses:
   M. G. BURKE,
   A. S. OBER.